United States Patent [19]

Yasuda et al.

[11] 4,227,180

[45] Oct. 7, 1980

[54] CENTRALIZED MONITOR AND CONTROL SYSTEM

[75] Inventors: Katsuya Yasuda, Yokohama; Akio Adachi, Kawasaki, both of Japan

[73] Assignee: Hochiki Corporation, Tokyo, Japan

[21] Appl. No.: 792

[22] Filed: Jan. 3, 1979

[30] Foreign Application Priority Data

Jan. 9, 1978 [JP] Japan .................................... 53-520
Jan. 9, 1978 [JP] Japan .................................... 53-521

[51] Int. Cl.[3] ........................ H04Q 9/00; G08B 29/00

[52] U.S. Cl. ................................ 340/166 R; 340/176; 340/518; 340/525

[58] Field of Search .................. 340/166 R, 518, 525, 340/176

[56] References Cited

U.S. PATENT DOCUMENTS

| | | | |
|---|---|---|---|
| 3,402,404 | 9/1968 | Burley et al. | 340/176 |
| 3,665,303 | 5/1972 | Richards et al. | 340/518 X |
| 3,740,709 | 6/1973 | Savino | 340/525 X |

FOREIGN PATENT DOCUMENTS

| | | |
|---|---|---|
| 1069457 | 5/1967 | United Kingdom . |
| 1073054 | 6/1967 | United Kingdom . |
| 1201023 | 8/1970 | United Kingdom . |
| 1322665 | 7/1973 | United Kingdom . |
| 1344619 | 1/1974 | United Kingdom . |

*Primary Examiner*—Donald J. Yusko
*Attorney, Agent, or Firm*—Haseltine, Lake & Waters

[57] ABSTRACT

A centralized monitor and control system includes a plurality of pairs of link lines which connect, in matrix form, a plurality of alarm switches, controlled devices, etc., installed at an alarming terminal end with a plurality of alarm display devices, starting control switches, etc., installed at a receiving end in correspondence with the devices at the terminal end, whereby the display devices adapted to be actuated by the alarm switches or the controlled devices adapted to be actuated by the control devices are operated in response to sequential scanning of the one link lines of the paired link system, thus decreasing the number of the link lines used.

The number of the link lines used can be decreased further by effecting the sequential scanning by means of a parallel set of binary coded pulse signals and by connecting the one link line array of the matrix to the alarm switches or the controlled devices and the display devices or the control switches through logical circuits.

7 Claims, 5 Drawing Figures

CENTRALIZED MONITOR AND CONTROL SYSTEM

BACKGROUND OF THE INVENTION

The present invention relates to centralized monitor and control systems for remotely monitoring the conditions of the alarming terminal ends from the receiving end, or selectively controlling a plurality of controlled devices at the alarming terminal end from the receiving end or performing both of these functions, and more particularly the invention relates to an improvement in such system whereby the number of link lines for connecting the receiving end with the alarming terminal end is reduced.

In known monitor and control systems such as fire alarm systems, it has been the usual practice to connect the receiver of the system to the alarm transmitters at the alarming terminal end as well as many other disaster preventing devices by means of a large number of link lines which provide one-to-one paired connection between the receiver and the individual devices. As a result, where the processing of data from a large number of monitoring points or the selective control of a large number of control points in a complex, large building or the like is effected centrally at a remotely located centralized system, a very large number of link lines are required to connect the receiver to the large number of monitoring points and control points, thus unavoidably resulting in a great increase in the wiring cost.

SUMMARY OF THE INVENTION

It is a principal object of the present invention to provide a centralized monitor and control system whereby the centralized monitoring of a large number of monitoring points or the centralized control of a large number of control points can be effected with a reduced number of link lines.

It is another object of the invention to provide a centralized monitor and control system wherein a receiving end and an alarming terminal end are connected to each other by means of first and second link lines in such a manner that a plurality of first means, such as, alarm switches provided at the terminal end or actuating control switch means provided at the receiving end and a plurality of second means, such as, display devices provided at the receiving end or controlled apparatus actuating relay means provided at the terminal end are connected in matrix form between the first and second link lines in a manner that the first and second link lines respectively serve as column and row signal lines, whereby as many pairs of the first and second means as the product of the number of the first link lines and the number of the second link lines can be monitored and controlled centrally from the receiving end.

It is still another object of the invention to provide such centralized monitor and control system wherein one or the other of the first and second link lines are connected to one terminal of a DC power source provided at the receiving end and the other link lines are scanned in such a manner that the lines are connected sequentially to the other terminal of the DC power source, whereby the independent remote monitor and control operation of each pair of the large number of the first and second means connected in matrix form can be positively accomplished at all times (whether simultaneously or not) by means of the signal power source.

It is still another object of the invention to provide such centralized monitor and control system wherein the other link lines adapted to be scanned are connected to the first and second means through logical circuits so as to effect the scanning by means of a parallel set of binary coded pulse signals, whereby even if the number of the other link lines is reduced to the same number as the bits in the binary coded pulse signal, the number of pairs of the first and second link lines for every one of the other link lines can be increased up to a number (decimal number) corresponding to the maximum binary number that can be assumed by the binary coded pulse signal, that is, where the number of the other link lines is 3, by scanning the link lines with a 3-bit binary coded pulse signal, it is possible to effect the centralized monitoring and control on 8 pairs of the first and second means for every one of the other link lines.

It is still another object of the invention to provide such centralized monitor and control system wherein the respective link lines can be monitored for breaking from the receiving end by the provision of one or two additional link lines.

In accomplishing the above objects, the improved centralized monitor and control system provided in accordance with a basic form of the present invention comprises a plurality of first means provided at one or the other of a receiving end and an alarming terminal end, a plurality of second means provided at the other of the terminals and a plurality of link lines connecting the first means with the second means in such a manner that the operation of one or the other of the first and second means causes the other means to operate correspondingly in response to the supply of power from a DC power source provided at the receiving end, wherein the plurality of link lines comprise a plurality of first link lines and a plurality of second link lines which interconnect the first and second means in matrix form so as to associate the first and second means correspondingly, and the receiving end includes circuit means for connecting each of the first link lines to one terminal of the DC power source and scanning means for sequentially bringing the second link lines to the same potential as the other terminal of the DC power source, whereby in accordance with the combination of a change in the potential of the first link line due to the operation of one or the other of the first and second means and a change in the potential of the second line due to the scanning by the scanning means, the other of the first and second means is brought into operation correspondingly.

In accordance with another embodiment of the invention, the first means comprise a plurality of alarm switches provided at the alarming terminal end, and the second means comprise a plurality of display devices provided at the receiving end with each display device being adapted to be operated by the operation of the scanning means in response to the operation of associated one of the alarm switches.

In accordance with still another embodiment of the invention, the first means comprise a plurality of control switch means provided at the receiving end, the second means comprise a plurality of controlled relay means provided at the alarming terminal end, and the circuit means includes controlling energization switch means responsive to the operation of the control switch means so that the first link line connected to the actuated control switch means is readied for connection to the one terminal of the DC power source, whereby when one of the second link lines connected to the actuated control switch means is scanned by the scanning means, the controlling energization switch means connected to the actuated control switch means comes into operation to operate the associated controlled relay means.

In accordance with still another embodiment of the invention, in addition to the above-mentioned basic form, the system comprise first and second monitor lines provided between the receiving end and the alarming terminal end and a plurality of break monitoring detectors provided at the terminal end so as to practically establish a short-circuit between the first and second monitor lines when the potential at the one terminal of the DC power source is appearing on each of the first link lines. The receiving end is designed so that the second monitor line is connected to the other terminal of the DC power source, and after the first scanning in which the second link lines are sequentially connected to the other terminal of the DC power source by the scanning means during its one scanning cycle, a second scanning is effected in which the first link lines are sequentially forcibly brought to the same potential as the one terminal of the DC power source. The receiving end is further provided with a break monitor and display means responsive to the operation of the second scanning to display for each of the first link lines whether the first monitor line has been short-circuited with the second monitor line.

While, with each of these embodiments, the scanning means may be of the type which sequentially connects the plurality of second link lines one by one to the other terminal of the DC power source, in accordance with still another embodiment of the invention the number of second link lines is equal to the number of bits in the binary coded pulse signals which provide a binary number corresponding to the number of pairs of the first and second means each adapted to be connected to the same line of the plurality of second link lines, and the first and second means forming each pair and connected at their one ends to the first link line are respectively connected at the other ends to the output of logical circuits respectively provided at the receiving and alarming terminal ends thus providing a matrix connected network of the first and second means with a plurality of the paired logical circuits disposed between the first and second link lines. The scanning means is connected to a counter circuit adapted to be operated by a clock pulse generator so that the inputs of the logical circuits are controlled by the binary coded pulse signals through the second link lines which are equal to the number of bits, and the bits of the binary coded pulse signals generated from the counter circuits are applied as parallel set signals to the second link lines so as to sequentially bring the output terminals of the paired logical circuits to the same potential as the other terminal of the DC power source.

In accordance with still another embodiment of the invention there is provided a centralized monitor and control system wherein the receiving end includes a plurality of display devices and a plurality of control switch means, and the alarming terminal end includes a plurality of alarm switches and a plurality of controlled relay means. The display devices and the alarm switches are interconnected in matrix form by a plurality of alarm link lines and common link lines to associate the display devices and the alarm switches with one another individually, and the control switch means and the controlled switch means are interconnected in matrix form by a plurality of control link lines and the common link lines so as to associate the control switch means and the controlled relay means with one another individually. At the receiving end each of the alarm link lines is connected by way of a resistor to the one terminal of the DC power source, and each of the control link lines is connected to the one terminal of the DC power source by way of controlling energization switch means adapted to be enabled in response to the operation of the control switch means connected to each said control link line. The receiving end also includes scanning means adapted to sequentially bring the common link lines to the same potential as the other terminal of the DC power source, whereby when one of the common link lines connected to the actuated alarm switch is scanned by the scanning means the display device connected to the same common link line is operated correspondingly, and when the common link line connected to the control switch means actuated in response to the actuated display device is scanned by the scanning means the controlling energization switch means connected to the actuated control switch means is energized to connect one of the control link lines to the one terminal of the DC power source and thereby to actuate the controlled relay means connected to the control link line and the scanned common link line. The centralized monitor and control system of this embodiment may be further provided with a break monitor link line provided between the receiving end and the alarming terminal end so that at the receiving end the break monitor link line is sequentially brought to the same potential as the other terminal of the DC power source by the scanning means during its scanning cycle in succession to the common link lines, and the alarming terminal end includes a plurality of break monitoring detector each adapted to detect, with respect to each of the control link lines and the alarm link lines, whether the potential at the one terminal of the DC power source is appearing on each control link line and thereby to substantially short-circuit the associated alarm link line with the break monitor link line. The receiving end further includes means adapted to energize all the controlling energization switch means when the break monitor link line is brought to the same potential as the other terminal of the DC power source in response to the scanning of the scanning means, and a plurality of break monitoring display devices each having one input terminal connected in common to the break monitor link line and the other input terminal connected to one of the alarm link lines, whereby each break display device indicates the occurrence of a break when only its one input terminal is at the same potential as the other terminal of the DC power source.

It will thus be seen that in accordance with the present invention the centralized monitor and control of a large number of monitor points and control points can be accomplished with a great reduction in the number of link lines provided between a receiving end and an alarming terminal end. In particular, greater the number of monitor points or control points, the effect of reducing the number of link lines will be increased.

The above objects and advantages of the invention will become more apparent from the following detailed description of preferred embodiments taken in conjunction with the accompanying drawings.

DESCRIPTION OF THE PREFERRED EMBODIMENTS

Figure 1:
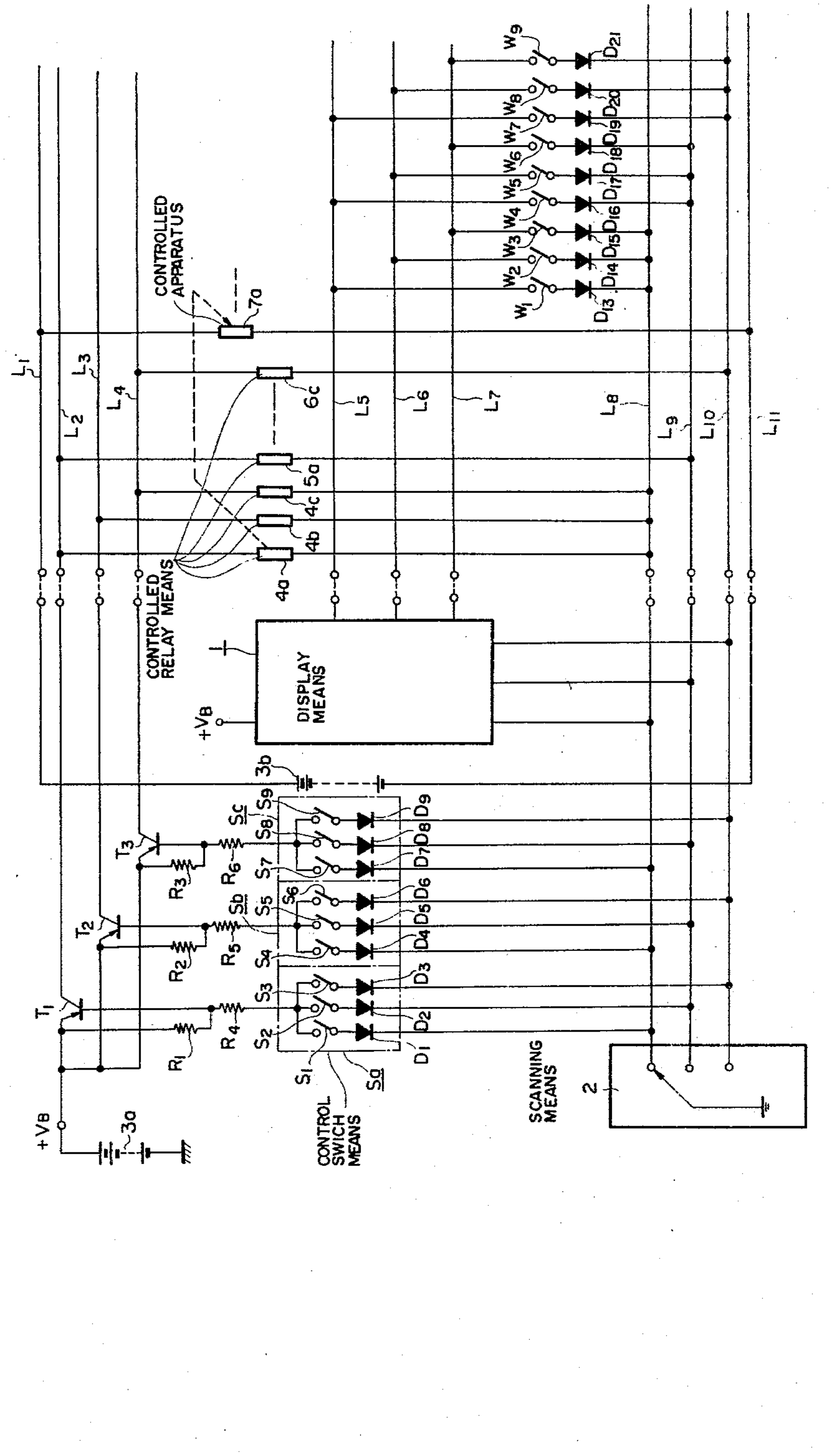
FIG. 1 is a circuit diagram showing a first basic embodiment of the invention.
Figure 2:
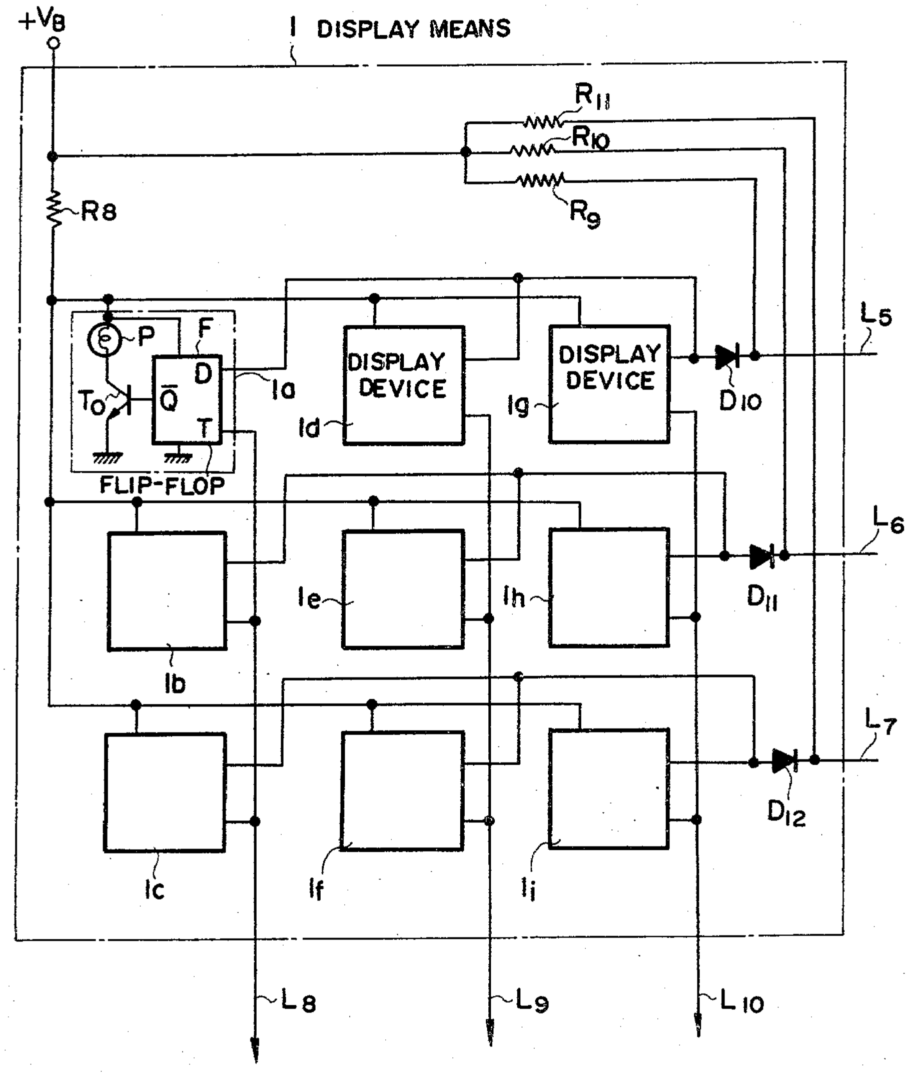
FIG. 2 is a circuit diagram showing an embodiment of the display means shown in FIG. 1.

Referring now to FIGS. 1 and 2 showing a first embodiment of the invention, provided at a receiving end are display means 1 including a plurality of display devices 1*a*, 1*b*, - - - , 1*i*, a plurality of control switches $S_1$ to $S_9$, transistors $T_1$ to $T_3$ constituting controlling energization switch means, scanning means 2, a monitor and control DC power source 3*a* and a driving power source 3*b* for controlled apparatus, and provided at an alarming terminal end are a plurality of alarm switches $w_1$ to $w_9$, a plurality of controlled relay means 4*a* to 4*c*, 5*a* to 5*d* and 6*a* to 6*c*, and a plurality of controlled apparates 7*a* - - - . Provided between the receiving end and the alarming terminal end are a plurality of control link lines $L_2$ to $L_4$, alarm link lines $L_5$ to $L_7$, common link lines $L_8$ to $L_{10}$ and supply lines $L_1$ and $L_{11}$ for the controlled apparatus. In the Figures, the display devices, alarm switches, control switches and controlled relay means are equal in number (e.g., 9), and the controlled relay means 5*b*, 5*c*, 6*a* and 6*b* are not shown. Also in the Figures, only the controlled apparatus 7*a* is shown which is operated by the controlled relay means 4*a* and the remainder is not shown. The alarm switches may each be comprised for example of a fire alarm or burgular alarm manual transmitting switch or automatic sensor, and in the illustrated embodiment the nine alarm switches $w_1$ to $w_9$ and the nine display devices 1*a* to 1*i* are connected in matrix form through the three alarm link lines $L_5$ to $L_7$ and the three common link lines $L_8$ to $L_{10}$, thus operatively associating the alarm switches and the display devices with one another individually. The alarm link lines are respectively connected through resistors $R_9$ to $R_{11}$ to one terminal ($+V_B$) of the DC power source 3*a*, and the common link lines are repeatedly sequentially connected by the scanning means 2 to the other terminal (ground) of the DC power source 3*a*. A centralized monitor unit is provided by the arrangement including the alarm switches and the display devices interconnected in matrix form by the alarm link lines and the common link lines and the scanning means provided for the common link lines. In FIG. 1, in addition to the centralized monitor unit there is provided a centralized control unit in which the control switches $S_1$ to $S_9$ and the controlled relay means 4*a* to 6*c* are interconnected in matrix form by the control link lines $L_2$ to $L_4$ and the common link lines $L_8$ to $L_{10}$ through the transistors $T_1$ to $T_3$, and the DC power source 3*a*, the scanning means 2, and the common link lines $L_8$ to $L_{10}$ are used in common by the two units. Each of the control switches may for example be an actuating switch means such as a manually operated switch or an automatic switch associated with corresponding one of the display devices so as to operate in response to the operation of the display device, and each of the controlled relay means is operable in response to the operation of the associated control switches so as to actuate its associated controlled apparatus such as a fire door or shutter, smoke exhauster, fire extinguisher, alarm or the like. While the contactless or contact type relay having a self-holding function and incorporated in the controlled apparatus may be used as such for the controlled relay means, it is preferable to arrange so that the controlled apparatus 7*a* - - - are actuated by another power source 3*b* in place of the DC power source 3*a* and the starting of the controlled apparatus are effected in response to the operation of the controlled relay means supplied from the DC power source 3*a* and each consisting of a relay or the like, thus making it possible to use an AC power source as the power source 3*b*.

At the receiving end the transistor $T_1$ or controlling energization switch means has its emitter connected to the positive terminal ($+V_B$) of the DC power source 3*a* and its collector connected to the control link line $L_2$, and a resistor $R_1$ is connected between the emitter and base of the transistor $T_1$. The base of the transistor $T_1$ is also connected to one ends of the control switches $S_1$, $S_2$ and $S_3$ through a resistor $R_4$, and the control switches $S_1$, $S_2$ and $S_3$ constitute, as a group, control switch means S*a* associated with the control link line $L_2$. The base of the transistor $T_1$ is connected to the common link lines $L_8$, $L_9$ and $L_{10}$ through the resistor $R_4$ and three series circuits provided by the control switches $S_1$, $S_2$ and $S_3$ of normally open contact type and diodes $D_1$, $D_2$ and $D_3$, respectively.

In the same way as the above-described construction with respect to the transistor $T_1$, resistors $R_2$ and $R_3$ are respectively connected between the emitter and base of the transistors $T_2$ and $T_3$, and the bases of the transistors $T_2$ and $T_3$ are respectively connected to the common link lines $L_8$, $L_9$ and $L_{10}$ through resistors $R_5$ and $R_6$, respectively, and control switch means S*b* comprising three series circuits provided by the control switches $S_4$ to $S_6$ and diodes $D_4$ to $D_6$ and control switch means S*c* comprising three series circuits provided by the control switches $S_7$ to $S_9$ and diodes $D_7$ to $D_9$. The transistors $T_2$ and $T_3$ have their collectors respectively connected to the control link line $L_3$ and the control link line $L_4$ and their emitters connected, along with the emitter of the transistor $T_1$, to the positive terminal ($+V_B$) of the DC power source 3*a*. Thus, in the like manner as the transistor $T_1$, each of the transistors $T_2$ and $T_3$ has its base connected to the common link lines through the control switches thus constituting controlling energization switch means which is designed so that when any of the common link lines is grounded by the scanning means, the switch means is turned on to connect the positive terminal of the DC power source to the corresponding control link line.

The scanning means 2 comprises for example a combined circuit of a clock pulse generator and a switching element and its repeates at a predetermined period a scanning operation of sequentially connecting one by one the common link lines $L_8$, $L_9$ and $L_{10}$ to the negative terminal (ground) of the DC power source 3*a*. As shown in detail in FIG. 2, the display means 1 comprises the same number of the display devices 1*a* to 1*i* as the alarm switches $w_1$ to $w_9$ at the terminal end, and each display device includes a lamp P which is turned on and off to indicate the corresponding turning on and off of the alarm switches.

While only the internal construction of the display device 1*a* is shown in FIG. 2, the display devices 1*b* to 1*i* each has the same construction and comprises a flip-flop circuit F, a transistor $T_o$ adapted to be controlled by the inverted output $\overline{Q}$ of the flip-flop circuit F and a lamp P adapted to be turned on by the conduction of the transistor $T_o$.

The alarm link lines $L_5$ to $L_7$ are connected to the display means 1 and are also connected to the positive terminal ($+V_B$) of the DC power source 3*a* through the resistors $R_9$ to $R_{11}$. In the display means 1 the alarm link line $L_5$ is connected through a diode $D_{10}$ backwardly to one output terminal D of the flip-flop circuit F in the display devices 1*a*, 1*d* and 1*g*, respectively. In the like manner, the alarm link line $L_6$ is connected through a diode 11 backwardly to one input terminal D of the flip-flop circuit F in the display devices 1*b*, 1*e* and 1*h*, respectively, and the alarm link line $L_7$ is connected through a diode $D_{12}$ backwardly to one input terminal D of the flip-flop circuit F in the display devices 1*c*, 1*f* and 1*i*, respectively.

On the other hand, the other input terminal T of the flip-flop circuits F in the display devices are connected in such a manner that those of the display devices 1*a*, 1*b* and 1*c* are all connected to the common link line $L_8$, those of the display devices 1*d*, 1*e* and 1*f* are connected to the common link line $L_9$ and those of the display devices 1*g*, 1*h* and 1*i* are all connected to the common link line $L_{10}$. In the like manner as the display device 1*a* shown in FIG. 2, each of the flip-flop circuits F has its inverted output terminal $\overline{Q}$ grounded through the emitter-base circuit of the transistor $T_o$, and the collector of the transistor $T_o$ is connected to the positive terminal ($+V_B$) of the DC power source 3*a* through the lamp P. Designated at $R_8$ is a current limiting resistor.

At the alarming end the alarm link lines $L_5$, $L_6$ and $L_7$ are connected in matrix form to the common link lines $L_8$, $L_9$ and $L_{10}$ through nine series circuits provided by the alarm switches $w_1$ to $w_9$ and diodes $D_{13}$ to $D_{21}$. On the other hand, the control link lines $L_2$, $L_3$ and $L_4$ are also connected in matrix form to the common link lines $L_8$, $L_9$ and $L_{10}$ through the nine controlled relay means 4*a* to 6*c* (of which 5*b*, 5*c*, 6*a* and 6*b* are not shown in FIG. 1). In this case, the controlled relay means 4*a* is associated with the alarm switch $w_1$, and similarly the other controlled relay means 4*b*, 4*c*, 5*a*, - - -, 6*c* are respectively associated with the alarm switches $w_2$, $w_3$, $w_4$, - - - , $w_9$. Connected to the ends of the supply lines $L_1$ and $L_{11}$ is the controlled apparatus 7*a* adapted to be started by the operation of the controlled relay means 4*a*, and similarly each of the other controlled relay means is connected to a controlled apparatus (not shown) which is operated by the former. If the controlled apparatus is one which completes its operation by only a temporary energization, such as an electromagnetic release for fire door, the apparatus may be connected in place of the controlled relay means between the control link line and the common link line.

With the above-described embodiment shown in FIGS. 1 and 2, the receiving end and the alarming terminal end are connected with each other through the nine link lines excluding the supply lines $L_1$ and $L_{11}$ so as to respectively centrally monitor and control the nine monitor points and the nine control points, and the operation of the embodiment is as follows.

The scanning means 2 scans the common link lines $L_8$, $L_9$ and $L_{10}$ at predetermined time intervals so as to periodically ground these lines sequentially, and consequently when for example the alarm switch $w_1$ is closed with the common link line $L_8$ being grounded, the potential of the alarm link line $L_5$ is brought to the ground potential. As a result, the lines $L_5$ and $L_8$ both have the ground potential, with the result that the one input terminal D of the flip-flop circuit F in the display device 1*a* goes to the ground potential and the other input terminal T also goes to the ground potential, thus causing only the output $\overline{Q}$ of the flip-flop circuit F in the display device 1*a* to go to a high level potential. When this occurs, only in the display device 1*a* the transistor $T_o$ is turned on and the lamp P is turned on. In this case, by using the flip-flop circuit F of a type which stores its output state depending on the input state of the one input terminal D with the other input terminal T being at the ground potential, in case the closing of the alarm switch $w_1$ and the grounding of the common link line $L_8$ are effected simultaneously for once, the lamp P of the display device 1*a* can be turned on continuously even if the once closed alarm switch $w_1$ is opened or the once grounded common link line $L_8$ is disconnected with the ground. In this way, the closing of the alarm switch $w_1$ can be recognized by the lighting of the lamp in the display device 1*a*.

Then, when the corresponding control switch $S_1$ is closed manually in response to the lighting of the lamp in the display device 1*a*, the transistor $T_1$ is conditioned for conduction and consequently the transistor $T_1$ is turned on when the common link line $L_8$ is grounded by the action of the scanning means 2. As a result, the positive terminal ($+V_B$) of the power source 3*a* is connected to the control link line $L_2$, so that since the common link line $L_8$ is being grounded by the scanning, during this time the voltage across the DC power source 3*a* is applied to the controlled relay means 4*a* and only the controlled relay means 4*a* is brought into operation. In this case, the controlled relay means 4*a* is energized only during the time that the common link line $L_8$ is being grounded by the scanning means 2, and consequently if the controlled relay means is of the type having no self-holding function, the scanning period, controlled apparatus starting conditions, etc. must be selected so that the starting of the controlled apparatus is completed within the grounding time interval.

While, in the case described above, the control switch $S_1$ was operated manually, it is possible for example to design so that the control switch $S_1$ operates automatically in response to the operation of the transistor $T_o$ in the display device 1*a*. The same operation as described above takes place in response to the operation of any of the other alarm switches in addition to the alarm switch $w_1$, thus bringing into operation the display device, control switch, controlled relay means and controlled apparatus which are associated with the actuated alarm switch.

The lamp of each display device may be replaced with numerical display elements each consisting of a plurality of light emitting diode display segments in order to manually display the opening and closing of the individual alarm switches connected to the same common link line.

Figure 3:
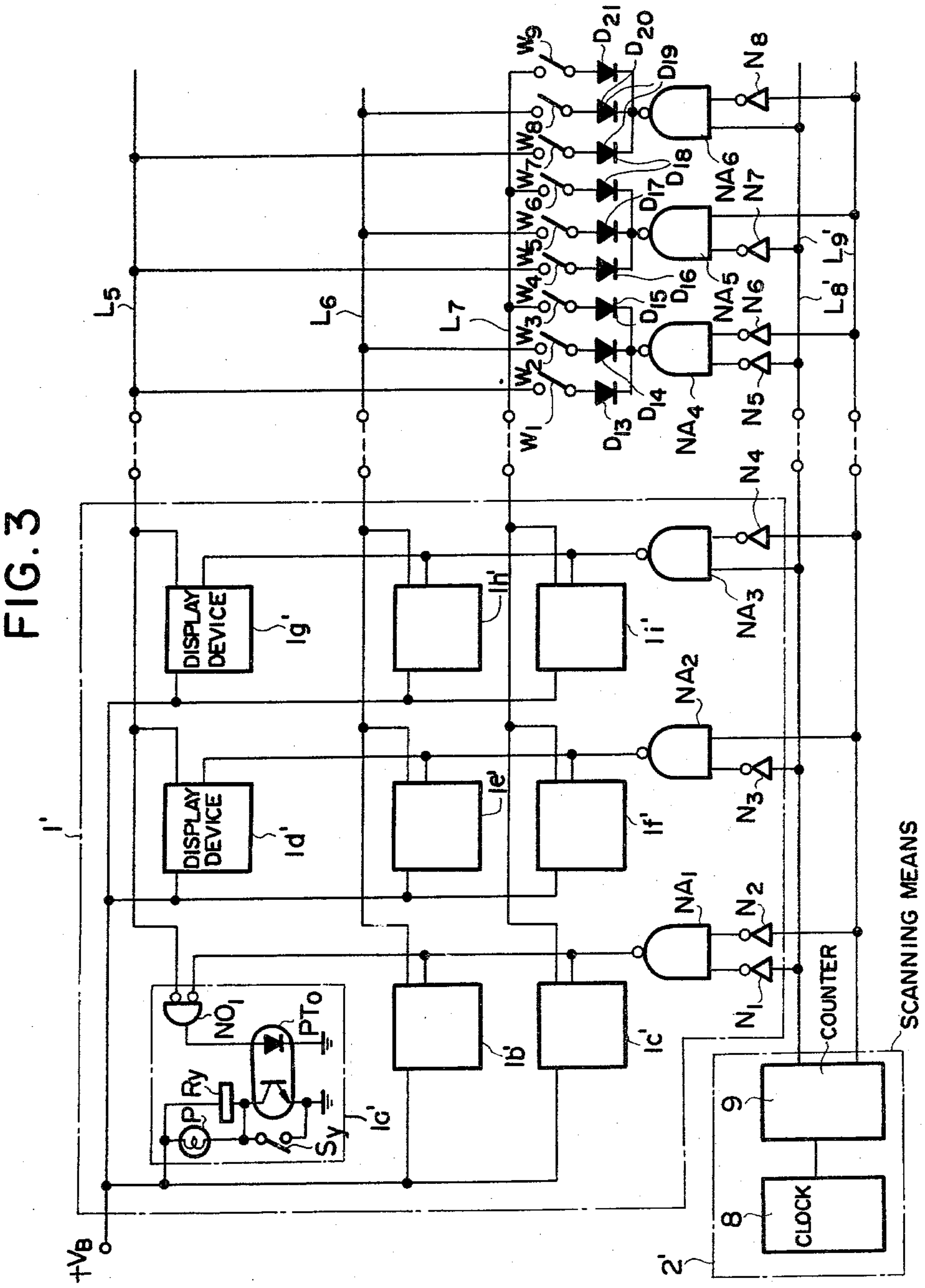
FIG. 3 is a circuit diagram showing a second embodiment of the invention.

Referring now to FIG. 3 there is illustrated a circuit diagram showing the basic construction of a second embodiment of the invention, and this embodiment provides an improved construction which in particular further decreases the number of common link lines. In the Figure, the same reference numerals as used in FIGS. 1 and 2 designate the same component parts, and the dashed reference numerals designate the corresponding component parts. Display means 1' comprises nine display devices 1$a'$ to 1$i'$ connected in matrix form, and each display device comprises, as shown with respect to the display device 1$a'$, a NOR circuit $NO_1$, a photo coupler $PT_o$ consisting of a light emitting diode adapted to light in response to a "1" output of the NOR circuit $NO_1$ and a phototransistor adapted to be turned on in response to the light from the light emitting diode, a lamp P and a relay coil Ry adapted to be operated in response to the conduction of the phototransistor of the photo coupler $PT_o$ and self-holding contacts Sy of the relay coil Ry. The display means 1' further comprises a NAND circuit $NA_1$ having its two input terminals respectively connected to common link links $L_8'$ and $L_9'$ through inverters $N_1$ and $N_2$, a NAND circuit $NA_2$ having its one input terminal connected to the common link line $L_8'$ through an inverter $N_3$ and the other input terminal connected directly to the common link line $L_9'$ and a NAND circuit $NA_3$ having its one input terminal connected directly to the common link line $L_8'$ and the other input terminal connected to the common link line $L_9'$ through the inverter $N_4$.

In the display means described above, the NOR circuit $NO_1$ in the display devices 1$a'$, 1$b$ and 1$c$, respectively, has its one input terminal connected to the output terminal of the NAND circuit $NA_1$, the NOR circuit $NO_1$ in the display devices 1$d'$, 1$e'$ and 1$f'$, respectively, has its one input terminal connected to the output terminal of the NAND circuit $NA_2$, and the NOR circuit $NO_1$ in the display devices 1$g'$, 1$h'$ and 1$i'$, respectively, has its one input terminal connected to the output terminal of the NAND circuit $NA_3$. The other input terminals of the NOR circuits $NO_1$ of the display devices 1$a'$, 1$d'$ and 1$g'$ are connected to an alarm link line $L_5$, those of the display devices 1$b'$, 1$e'$ and 1$h'$ are connected to an alarm link line $L_6$ and those of the display devices 1$c'$, 1$f'$ and 1$i'$ are connected to an alarm link line $L_7$.

Also at the terminal end, a NAND circuit $NA_4$ corresponding to the NAND circuit $NA_1$ is connected to the common link lines $L_8'$ and $L_9'$ through inverters $N_5$ and $N_6$, respectively, and similarly NAND circuits $NA_5$ and $NA_6$ respectively corresponding to the NAND circuits $NA_2$ and $NA_3$ are respectively connected through inverters $N_7$ and $N_8$ to the common link lines $L_8'$ and $L_9'$. The output terminal of the NAND circuit $NA_4$ is connected to alarm switches $w_1$, $w_2$ and $w_3$ through diodes $D_{13}$, $D_{14}$ and $D_{15}$, respectively, the output terminal of the NAND circuit $NA_5$ is connected to alarm switches $w_4$, $w_5$ and $w_6$ through diodes $D_{16}$, $D_{17}$ and $D_{18}$, respectively, and the output terminal of the NAND circuit $NA_6$ is connected to alarm switches $w_7$, $w_8$ and $w_9$ through diodes $D_{19}$, $D_{20}$ and $D_{21}$, respectively.

The receiving end further comprises scanning means 2' comprising a clock pulse generator 8 and a counter 9, and in the illustrated embodiment the counter 9 is a binary counter since the two common link lines $L_8'$ and $L_9'$ are employed. The counter 9 has its two output terminals respectively connected to the common link lines $L_8'$ and $L_9'$ and consequently 2-bit binary coded pulse signals 00, 01, 10 and 11 are sequentially applied as parallel set signals periodically to the common link lines $L_8'$ and $L_9'$. Of course, the "0" signal corresponds to the potential of the negative terminal of the power source 3$a$ and the "1" signal corresponds to the potential of its positive terminal ($+V_B$). The NAND circuits $NA_1$ and $NA_4$ each generates a "0" signal at its output terminal only when the common link lines $L_8'$ and $L_9'$ are both set to "0" and a "1" signal is generated at the output terminal by any other set states of the lines $L_8'$ and $L_9'$. Similarly, the NAND circuits $NA_2$ and $NA_5$ each generates a "0" signal at its output terminal only when the common link lines $L_8'$ and $L_9'$ are respectively set to "0" and "1" and a "1" signal is generated at the output terminal by any other set states of the lines $L_8'$ and $L_9'$. The NAND circuits $NA_3$ and $NA_6$ each generates a "0" signal only when the lines $L_8'$ and $L_9'$ are respectively set to "1" and "0" and a "1" signal is generated at the output terminal by any other states of the lines $L_8'$ and $L_9'$. Although not shown in FIG. 3, by providing at the receiving and alarming terminal ends additional pairs of NAND circuits each adapted to generate a "0" signal at its output only when the lines $L_8'$ and $L_9'$ are both set to "1", it is possible to further increase the number of pairs of the display devices as well as the alarm switches.

With the circuit construction described above, when the common link lines $L_8'$ and $L_9'$ are both set to "0" by the scanning of the scanning means 2' and simultaneously the alarm switch $w_1$ is closed, only in the display device 1$a'$ the input terminals of the NOR circuit $NO_1$ both go to "0" so that the NOR circuit $NO_1$ generates a "1" signal and the phototransistor of the photo coupler $PT_o$ is turned on. Consequently, the lamp P is turned on and the relay coil Ry is energized thus closing the self-holding contacts Sy. The closing of the contacts Sy has the effect of maintaining the lighting of the lamp P even if the set states of the common link lines $L_8'$ and $L_9'$ are thereafter changed. It is needless to say that this operation takes place between any other pair of the alarm switches and the display devices in one-to-one relation. While the embodiment of FIG. 3 has been described as applied by way of example to a monitor unit, it will readily appear to those skilled in the art that the similar modification may be made to the control unit of FIG. 1 including the paired control switches and controlled relay means. Further, by replacing the photo coupler $PT_o$ of each display device with one employing a photo thyristor in place of a phototransistor, the relay coil Ry and its contacts Sy may be eliminated.

With the embodiment shown in FIG. 3, by virtue of the fact that the common link lines $L_8'$ and $L_9'$ are scanned by parallely setting the same with binary coded pulse signals, practically the required four common link lines are reduced to the two common link lines $L_8'$ and $L_9'$, and generally a system of the type shown in FIG. 3 and employing N common link lines can produce the same effect as a system of the type shown in FIG. 1 and employing $2^n$ common link lines connected in matrix configuration. This reducing effect increases with an increase in the number of common link lines used. This construction is particularly advantageous and effective in cases where monitor devices and control devices are arranged by the same wiring using common link lines adapted for common use by the two devices. As for example, where 64 monitor points and 64 control points are subjected to centralized monitor and control, by using a system of the type shown in FIG. 3, it is possible to construct so that 8 alarm link lines and 8 control link lines are used and 3 common link lines are scanned with 3-bit binary coded pulse signals and in this way only a total of 19 link lines is needed. On the contrary, with the prior art system a total of 129 link lines, that is, $64+64=128$ link lines plus at least one common return line are needed, and even with the system of FIG. 1 a total of 24 link lines is required.

With the embodiments shown in FIGS. 1 and 3, respectively, by constructing each of the alarm switches $w_1$ to $w_9$ with normally closed contacts and constructing each of the display devices to turn on its lamp in response to the closing of the alarm switch, it is possible to monitor the alarm link lines and the common link lines for breaking from the display means. In this case, by arranging so that when a break occurs in any link line, the same indication as the simultaneous opening of all the alarm switches connected to the link line is given, thus making it possible to discriminate the broken link line according to the indication.

Figure 4:
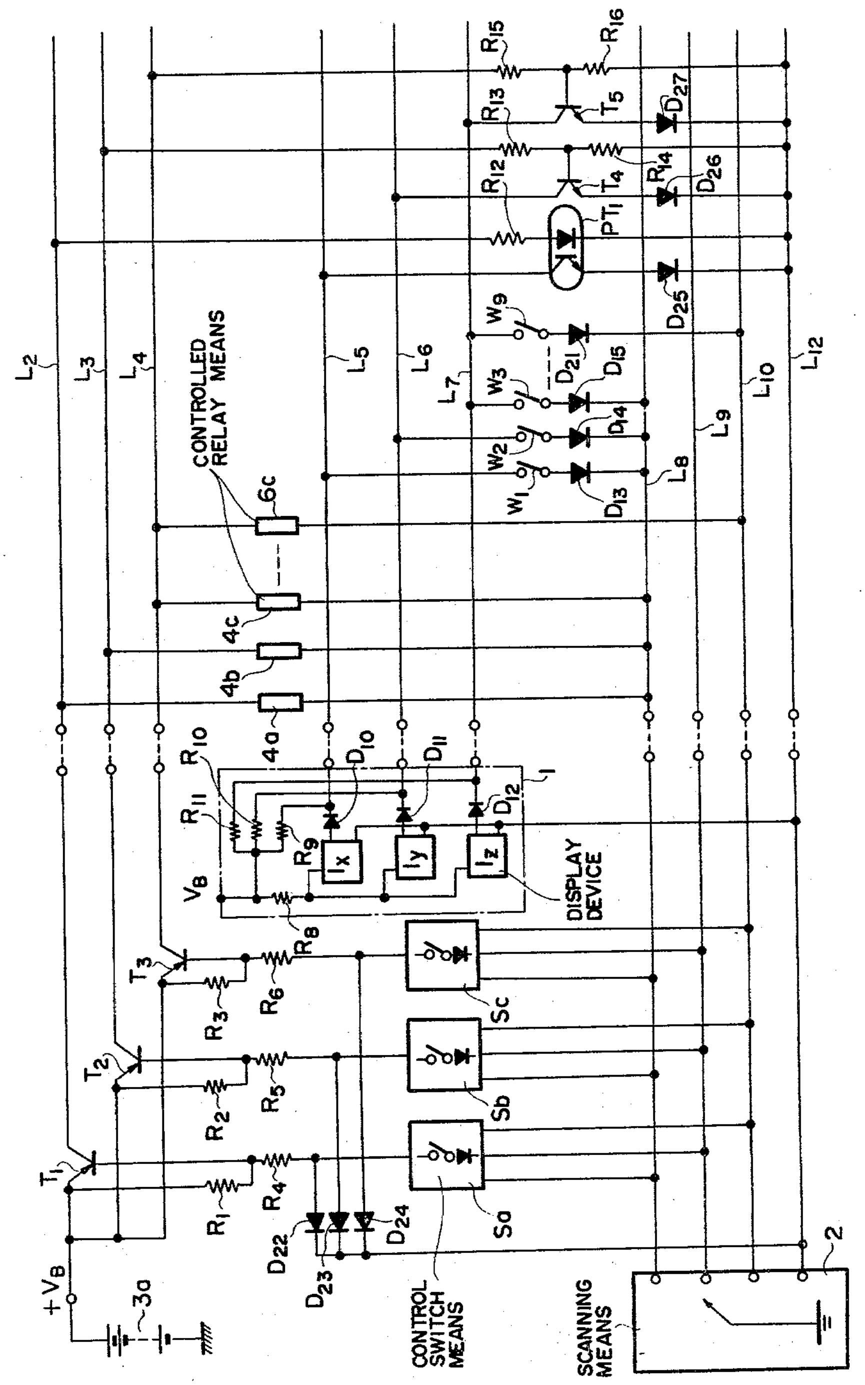
FIG. 4 is a circuit diagram showing a third embodiment of the invention.

Referring now to FIG. 4 showing still another embodiment of the invention, there is illustrated a break monitor system which is different from the above-described system and in this system each of the individual pairs of alarm and control link lines is monitored for break.

In the Figure, the same reference numerals are used in FIGS. 1 and 2 designate the same component parts, and the system of the controlled apparatus are not shown.

In the Figure, display means 1 comprises three display devices 1x, 1y and 1z of the same circuit construction in addition to nine display devices 1a to 1i which are not shown. The display devices 1x, 1y and 1z each comprises a flip-flop circuit, and the flip-flop circuits have their one input terminals respectively connected to alarm link lines $L_5$, $L_6$ and $L_7$ and the other input terminals all connected at the receiving end to a break monitoring common link line $L_{12}$ separately provided between the receiving end and the alarming terminal end. Scanning means 2 performs a periodical action which sequentially grounds common link lines $L_8$, $L_9$, $L_{10}$ and $L_{12}$. The receiving end includes three diodes $D_{22}$, $D_{23}$ and $D_{24}$ having their cathodes connected in common to the common link line $L_{12}$, and the anodes of the diodes $D_{22}$, $D_{23}$ and $D_{24}$ are respectively connected to the base of a transistor $T_1$ through a resistor $R_4$, to the base of a transistor $T_2$ through a resistor $R_5$ and to the base of a transistor $T_3$ through a resistor $R_6$.

On the other hand, the terminal end includes a photo coupler $PT_1$ consisting of a photodiode connected between a control link line $L_2$ and the common link line $L_{12}$ through a resistor $R_{12}$ and a phototransistor connected between the alarm link line $L_5$ and the common link line $L_{12}$ through a forward diode $D_{25}$, a transistor $T_4$ having its base connected to the dividing point of voltage dividing resistors $R_{13}$ and $R_{14}$ connected in series between a control link line $L_3$ and the common link line $L_{12}$, its collector connected to the alarm link line $L_6$ and its emitter connected to the common link line $L_{12}$ through a forward diode $D_{26}$, and a transistor $T_5$ having its base connected to the dividing point of voltage dividing resistors $R_{15}$ and $R_{16}$ connected in series between a control link line $L_4$ and the common link line $L_{12}$, its collector connected to the alarm link line $L_7$ and its emitter connected to the common link line $L_{12}$ through a forward diode $D_{27}$. The photo coupler $PT_1$ and the transistors $T_4$ and $T_5$ respectively constitute a break monitoring detector for the paired lines $L_2$ and $L_5$, $L_3$ and $L_6$, and $L_4$ and $L_7$, respectively.

With the embodiment shown in FIG. 4, each time the common link line $L_{12}$ is grounded by the scanning means 2, the phototransistor of the photo coupler $PT_1$ and the transistor $T_4$ and $T_5$ are all turned on when all the control link lines and the alarm link lines as well as the common link line $L_{12}$ are functioning normally. The reason is that the scanning means 2 decreases the base potential of the transistors $T_1$ to $T_3$ through the diodes $D_{22}$ to $D_{24}$ so that the transistors $T_1$ to $T_3$ are turned on and the positive terminal ($+V_B$) of a power source 3a is connected to the control link lines $L_2$ to $L_4$, and at this time the common link line $L_{12}$ is also at the ground potential. As a result, the alarm link lines $L_5$ to $L_7$ are practically short-circuited with the common link line $L_{12}$ by the conduction of the phototransistor of the photo coupler $PT_1$ and the transistors $T_4$ and $T_5$, thus causing all these lines to go to the ground potential and lighting the lamps in the display devices, 1x, 1y and 1z.

In other words, if all of the control link lines $L_2$ to $L_4$, the alarm link lines $L_5$ to $L_7$ and the common link line $L_{12}$ are functioning properly, when the common link line $L_{12}$ is grounded by the scanning means 2, the lamp is turned on in each of the display devices 1x, 1y and 1z. In this case, if the display devices 1x, 1y and 1z each has a self-holding function till the line $L_{12}$ is grounded again by the scanning means 2, the lamps are continuously turned on so long as the link lines are functioning properly. If they have no self-holding function, the lamps are turned on an off at the scanning period.

On the contrary, if a break is caused in any one of the link lines $L_2$ to $L_7$ and $L_{12}$, the lamp is turned off in at least any one of or in each of the display devices 1x, 1y and 1z. For example, if the line $L_2$ or $L_5$ is broken, even if the line $L_{12}$ is normal, the phototransistor of the photo coupler $PT_1$ is kept off, so that the line $L_5$ is not decreased to the ground potential and the lamp is turned off in the display device 1x, thus indicating the breaking of the line $L_2$ or $L_5$. When a break occurs in the line $L_{12}$, the lamp is turned off in each of the dislay devices 1x, 1y and 1z. With the embodiment shown in FIG. 4, as compared with the embodiment shown in FIG. 1, the single common link line $L_{12}$ is added to the link lines, thus making it possible to monitor for break all the control link lines and the alarm link lines provided between the receiving end and the terminal end in paired relation by virtue of the addition of a minimum number of link lines, and thus the embodiment has a great practical advantage from the maintenance point of view. It is needless to say that with the embodiment of FIG. 4, by effecting the required scanning through the parallel setting of the common link lines with binary coded pulse signals as in the case of FIG. 3, it is possible to reduce the common link lines $L_8$, $L_9$, $L_{10}$ and $L_{12}$ to the same number as there are the bits in the pulse signals by the provision of logical circuits such as NAND circuits.

Figure 5:
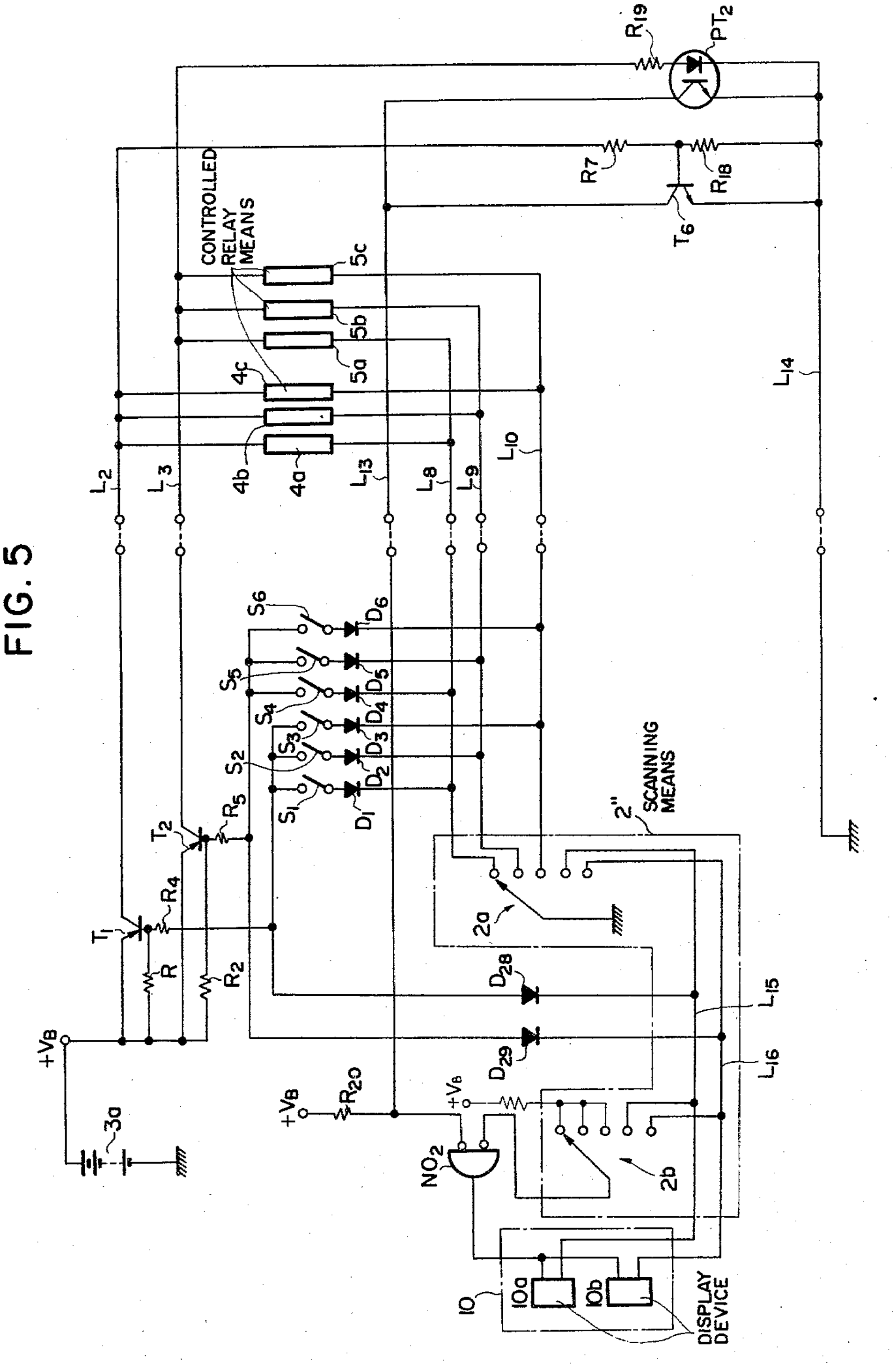
FIG. 5 is a circuit diagram showing a fourth embodiment of the invention.

FIG. 5 shows still another embodiment of the invention incorporating another break monitoring system. A feature of this embodiment is that the individual control link lines are separately monitored for break. FIG. 5 shows only the break monitor system for the control link lines and the other component parts such as the alarm link lines, etc., are not shown for purposes of simplicity. In the Figure, the same reference numerals are used in FIG. 1 designate the same component parts and the dashed reference numerals designate the corresponding component parts. Scanning means 2″ comprises a first scanner 2a adapted to perform a periodic operation by which common link lines $L_8$, $L_9$ and $L_{10}$ are sequentially grounded in the same manner as the scanning means 2 in the embodiment of FIG. 1 and then lines $L_{15}$ and $L_{16}$ are sequentially grounded and a second scanner 2b which operates in synchronism with the first scanner 2a so that when the lines $L_{15}$ and $L_{16}$ are sequentially grounded by the first scanner 2a, the grounded lines $L_{15}$ or $L_{16}$ is connected to one input terminal of a NOR circuit $NO_2$. The lines $L_{15}$ and $L_{16}$ are provided to connect the scanners 2a and 2b with each other. The line $L_{15}$ is connected to the base of a transistor $T_1$ through a resistor $R_4$ and a diode $D_{28}$, and the line $L_{16}$ is connected to the base of a transistor $T_2$ through a resistor $R_5$ and a diode $D_{29}$. The NOR circuit $NO_2$ is adapted to control a break monitor and display unit 10 by its output and the NOR circuit $NO_2$ has its other input terminal connected to a break monitoring alarm link line $L_{13}$ provided to extend from the receiving end to the terminal end. The link line $L_{13}$ is connected to the positive terminal ($+V_B$) of a power source 3a through a resistor $R_{20}$. The break monitor and display unit 10 comprises display devices 10a and 10b and is responsive to a "0" signal applied from the NOR circuit $NO_2$ to actuate the display device 10a or 10b connected to the grounded line $L_{15}$ or $L_{16}$. In the illustrated embodiment, the display device 10a displays the occurrence of a break in the control link line $L_2$ and the display device 10b displays the breaking of the control link line $L_3$. Another break monitoring common link line $L_{14}$ is provided to extend from the receiving end to the terminal end, and the common link line $L_{14}$ is grounded at the receiving end.

The terminal end includes a transistor $T_6$ having its base connected to the dividing point of voltage dividing resistors $R_{17}$ and $R_{18}$ connected in series between the control link line $L_2$ and the common link line $L_{14}$, its collector connected to the alarm link line $L_{13}$ and its emitter connected to the common link line $L_{14}$, and a photo coupler $PT_2$ comprising a light emitting diode connected between the control link line $L_3$ and the common link line $L_{14}$ through a resistor $R_{19}$ and a phototransistor responsive to the light produced from the light emitting diode to practically short-circuit the alarm link line $L_{13}$ and the common link line $L_{14}$. The transistor $T_6$ and the photo coupler $PT_2$ respectively constitute a break monitoring detector for the control link lines $L_2$ and $L_3$, respectively.

In the embodiment of FIG. 5, when the control link lines $L_2$ and $L_3$ are functioning properly, if for example the line $L_{15}$ is scanned and brought to the ground potential, the transistor $T_1$ is turned on so that current flows to the base of the transistor $T_6$ through the control link line $L_2$ and the resistor $R_{17}$ and the transistor $T_6$ is turned on, thus decreasing the potential at its collector or the alarm link line $L_{13}$ to the ground potential. Consequently, the two input terminals of the NOR circuit $NO_2$ each goes to the ground potential or "0" signal level and the output signal of the NOR circuit $NO_2$ go to "1". As a result, none of the display devices in the display means 10 are brought into operation, thus indicating that the line $L_2$ is functioning normally. When there is a break in the control link line $L_2$, the transistor $T_6$ is kept in the nonconductive state so that the potential of the alarm link line $L_{13}$ applied to one input terminal of the NOR circuit $NO_2$ goes to the high potential "1" and the output signal of the NOR circuit $NO_2$ goes to "0". As a result, the display device 10a connected to the grounded line $L_{15}$ is alone brought into operation and the breaking of the corresponding control link line $L_2$ is indicated.

As regards the control link line $L_3$, the occurrence of a break is monitored by the operation of the other display device 10b in accordance with the operation of the photo coupler $PT_2$.

We claim:

1. In a centralized monitor and control system comprising a receiving end, an alarm terminal end, a D.C. power source at said receiving end, a plurality of first means at one of said ends a plurality of second means at the other of said ends, a plurality of link lines connecting said first and second means such that the operation of one of said first and second means causes the other of said means to operate correspondingly through power supply from said D.C. power source at said receiving end, the improvement wherein said plurality of link lines include a plurality of first link lines and a plurality of second link lines to which said first and second means are connected in a matrix form so as to operatively associated individual parts of said first and second means, said receiving end including circuit means connecting each of said first link lines to one terminal of said D.C. power source and scanning means for sequentially connecting each of said second link lines to the other terminal of said D.C. source such that in response to a combination of a change in the potential of said first link lines caused by the operation of one of said first and second means and a change in the potential of said second link lines caused by the scanning of said scanning means, the other of said first and second means is brought into operation correspondingly, a first monitor line and a second monitor line provided between said receiving end and said alarm terminal end, said terminal end including a plurality of break monitoring detector means for establishing a short-circuit between said first and second monitor lines when the potential of one terminal of said D.C. power source appears on each of said first link lines, said second monitor line being connected to the other terminal of said D.C. power source at said receiving end, said scanning means being operative so that a first scanning of sequentially connecting each of said second link lines to the other terminal of said D.C. power source during one scan period is followed by a second scanning of sequentially connecting each of said first link lines forcibly to one terminal of said D.C. power source, said receiving end further including break monitor and indication means responsive to said second scanning for indicating, for each of said first link lines, whether said first monitor line is short-circuited with said second monitor line.

2. A system as set forth in claim 1, wherein said first means comprises a plurality of alarm switches at said alarm terminal end, said second means comprising a plurality of display devices at said receiving end, each of said display devices being actuated by the operation of an associated one of said alarm switches in response to the operation of said scanning means.

3. A system as set forth in claim 1, wherein said first means comprises a plurality of control switch means at said receiving end, said second means comprising a plurality of controlled relay means at said alarm terminal end, said circuit means including a plurality of controlling energization switch means each so disposed that one of said first link lines is conditioned for connection with the one terminal of said DC power source in response to the operation of one of said control switch means connected to said one first link line, whereby when one of said second link lines connected to said operated control switch means is scanned by said scanning means, one of said controlling energization switch means connected to said operated control switch means is brought into operation to actuate one of said controlled relay means associated therewith.

4. A system as set forth in claim 1, wherein said scanning means is disposed to sequentially connect said plurality of link lines to the other terminal of said DC power source.

5. A system as set forth in claim 1, wherein the number of said second link lines is equal to the number of bits in each of binary coded pulse signals providing a binary number corresponding to the number of pairs of said first and second means each thereof connected to the same one of said second link lines, each of said first means forming a pair with one of said second means having one end thereof connected to the same one of said first link lines as that of said corresponding first means, each said paired first and second means having the other ends thereof respectively connected to the output of corresponding one of a plurality of logical circuits provided at said receiving end and said alarm terminal end, respectively, thereby forming said first and second means into a matrix connected network with said plurality of paired logical circuits being disposed between said first link lines and said second link lines, said scanning means comprising a counter circuit actuated by a clock pulse generator so as to control inputs of said logical circuits with said binary coded pulse signals through said second link lines equal in number to said bits, whereby the bits of said binary coded pulse signals generated from said counter circuits are applied to said second link lines to sequentially bring the output terminals of said pairs of logical circuits to the same potential as the other terminal of said DC power source.

6. A centralized monitor and control system comprising: a receiving and; an alarm terminal end; a D.C. power source at said receiving and; a plurality of display devices and a plurality of control switch means at said receiving end; a plurality of alarm switches and a plurality of controlled relay means at said alarm terminal end; a plurality of alarm link lines and a plurality of common link lines connecting said display devices and said alarm switches in a matrix form to operatively associated said display devices and said alarm switches individually; a plurality of control link lines connecting, along with said common link lines, said control switch means and said controlled relay means in a matrix form to operatively associate said control switch means and said controlled relay means individually, each of said alarm link lines being connected to one terminal of said D.C. power source at said receiving end and each of said control link lines being connected to said one terminal of said D.C. power source respectively through controlling solid-state energization switch means placed in conduction state in response to the operation of said control switch means connected to each of said control link lines; and scanning means at said receiving end for sequentially bringing each of said common link lines to the same potential as the other terminal of said D.C. power source such that with one of said alarm switches operated, when one of said common link lines connected to said operated alarm switch is scanned by said scanning means, one of said display devices connected to said one common link line is operated correspondingly, and when one of said common link lines connected to one of said control switch means which is operated in response to said operated display device is scanned by said scanning means, one of said controlling solid-state energization switch means connected to said operated control switch means is energized to connect a corresponding one of said control link lines to said one terminal of said D.C. power source, thereby to operate one of said controlled relay means connected to said scanned common link line.

7. A centralized monitor and control system comprising: a receiving end; an alarm terminal end; a D.C. power source at said receiving end; a plurality of display devices and a plurality of control switch means at said receiving end; a plurality of alarm switches and a plurality of controlled relay means at said alarming terminal end; a plurality of alarm link lines and a plurality of common link lines connecting said display devices and said alarm switches in a matrix form to operatively associated said display devices and said alarm switches individually; a plurality of control link lines connecting, along with said common link lines, said control switch means and said controlled relay means in a matrix form to operatively associate said control switch means and said controlled relay means individually, each of said alarm link lines being connected to one terminal of said D.C. power source at said receiving end and each of said control link lines being connected to said one terminal of said D.C. power source respectively through controlling solid-state energization switch means placed in conduction state in response to the operation of said control switch means connected to each of said control link lines; scanning means at said receiving end for sequentially bringing each of said common link lines to the same potential as the other terminal of said D.C. power source, such that with one of said alarm switches operated, when one of said common link lines connected to said operated alarm switch is scanned by said scanning means, one of said display devices connected to said one common link line is operated correspondingly, and when one of said common link lines connected to one of said control switch means which is operated in response to said operated display device is scanned by said scanning means, one of said controlling solid-state energization switch means connected to said operated control switch means is energized to connect a corresponding one of said control link lines to said one terminal of said D.C. power source, thereby to operate one of said controlled relay means connected to said one control link line and said scanned common link line; a break monitor link line connected between said receiving end and said alarm terminal end to bring the break monitor link line to the same potential as the other terminal of said D.C. power source in succession to each of said common link lines by said scanning means during each scanning period thereof; a plurality of break monitoring detector means at said alarm terminal end for detecting for each of said control link lines and said alarm link lines, whether the potential of the other terminal of said D.C. power source appears on any of said control link lines, thereby to substantially short-circuit a corresponding one of said alarm link lines with said break monitor link line; means disposed at said receiving end to energize all of said controlling solid-state energization switch means when said break monitor link line is brought to the same potential as the other terminal of said D.C. power source in response to the scanning of said scanning means; and a plurality of break monitoring display devices having input terminals on one side thereof connected in common to said break monitor link line and input terminals on the other side thereof each connected to said alarm link lines such that each of said break monitoring display devices indicates the presence of a break when one of the input terminals is at the potential of the other terminal of said D.C. power source.

* * * * *